United States Patent [19]

Sorenson et al.

[11] 3,903,679
[45] Sept. 9, 1975

[54] DEAD MAN'S CONTROL FOR LAWN MOWER

[75] Inventors: Charles E. Sorenson, Mount Vernon; James E. Reynolds; Arnold A. DeBaillie, both of Evansville, all of Ind.

[73] Assignee: Hahn, Inc., Evansville, Ind.

[22] Filed: May 20, 1974

[21] Appl. No.: 471,198

[52] U.S. Cl. .................. 56/11.6; 56/11.8; 56/255; 74/523
[51] Int. Cl.² ................. A01D 69/08; A01D 55/18
[58] Field of Search ......... 56/11.6, 11.4, 11.5, 11.3, 56/220, 11.8, 255; 74/470, 491, 523

[56] References Cited
UNITED STATES PATENTS

| | | | |
|---|---|---|---|
| 2,256,583 | 9/1941 | Squires | 56/11.6 |
| 2,641,889 | 6/1953 | Bright | 56/11.6 |
| 2,894,412 | 7/1959 | Kaeser | 74/523 |
| 3,800,616 | 4/1974 | Hoffmeyer et al. | 56/11.3 |

*Primary Examiner*—Warner H. Camp
*Attorney, Agent, or Firm*—Jenkins, Hanley & Coffey

[57] ABSTRACT

A self-propelled lawn mower including an engine and a clutch for drivingly connecting the engine to the wheels, the clutch having an actuator member which is movable between a clutch engaging position and a clutch disengaging position with a spring for yieldably urging the actuator member to its disengaging position. A lever is mounted upon the handle of the lawn mower for pivotal movement toward and away from the hand grip on the handle. A control cable is connected between the clutch actuator member and the lever such that squeezing of the lever or pulling of the lever member toward the hand grip moves the actuator member against the urging of the spring toward its clutch engaging position. The proximal end of the control cable is connected to the lever at a first point thereon a first distance from the pivot axis of the lever. The lever and control cable are positioned and arranged such that a straight line extending between the lever axis and the first point is at a first angle with respect to the proximal end portion of the cable when the actuator member is in its clutch disenaging position and at a second and significantly smaller angle approaching zero with respect to said cable proximal end portion when the actuator member is in its clutch engaging position. Thus, the force necessary to hold the lever adjacent the hand grip is significantly less than the force necessary initially to pull the lever toward the hand grip. The same type of lever and control cable mechanism may be applied to the clutch for the lawn mower blade, for the wheel drive, or to a clutch for both the blade and the wheel drive.

2 Claims, 3 Drawing Figures

DEAD MAN'S CONTROL FOR LAWN MOWER

The present invention relates to self-propelled lawn mowers, and more particularly to the provision of a dead man's control for such lawn mowers which will be effective, when the control lever is released, to stop the movement of the mower.

The prior art is already aware of lever type controls for self-propelled lawn mowers and even dead man's controls. See, for instance, the very recent U.S. Pat. No. 3,800,616 issued Apr. 2, 1974 and citing in the text thereof U.S. Pat. Nos. 2,696,705; 2,903,077; and 3,190,386. The U.S. Pat. No. 3,800,616 discloses a lever which is pushed to its clutch-engaging position by the downward force of the weight of the hand and arm of the operator and stresses that this downward force eliminates the need for hand-squeezing which is required by the mechanism shown in the other said prior art references.

The present invention does require hand-squeezing, but the structure of the present invention is such that it takes less than, for instance, one pound of force to hold the lever in the clutch-engaging position. The structure is such that it takes, for instance, initially six or seven pounds of force to pull the lever toward its clutch-engaging position.

It is a primary object, therefore, of the present invention, to provide a hand-squeezing type of dead man's control which is constructed such that it takes a substantial but comfortable pulling force or squeezing force initially to move the lever toward its clutch-engaging position and only a slight force to hold the lever in its clutch-engaging position. This is accomplished by having the lever and the control cable or flexible cable connected between the lever and the clutch actuator member move toward, but not quite reach, an over-center relationship when the lever is in its clutch-engaging position.

The present invention therefore, involves the improvement comprising lever means for moving the clutch actuator member to its clutch-engaging position, thereby to move the frame of the lawn mower by the prime mover or engine mounted thereon. The lever means includes a lever, means for mounting the lever on the handle of the lawn mower for pivotal movement about an axis toward and away from the hand grip on the handle. A control cable is connected between the actuator member and the lever such that movement of the lever toward the hand grip moves the actuator member against the urging of the clutch spring means toward its said clutch-engaging position. The proximal end of the control cable is connected to the lever at a first point thereon a first distance from the pivot axis of the lever while the distal end of the cable is connected to the actuator member. The lever and control cable are positioned and arranged such that a straight line extending between the lever axis and the said first point is at a first angle with respect to the proximal end portion of the cable when the actuator member is in its clutch-disengaging position and at a second and significantly smaller angle approaching zero with respect to the said proximal end portion when the actuator member is in its clutch-engaging position, whereby the force necessary to hold the lever adjacent the hand grip is significantly less than the force necessary initially to pull the lever toward the hand grip. As will be seen hereinafter, a sheath is provided for the cable and means is provided for connecting the sheath to the handle at a second point spaced apart from the lever axis, whereby the proximal end portion of the cable between its connection to the lever and the point of connection of the sheath to the handle flexes generally about the sheath connection point between the said first angle position and the second angle position.

Another object of the present invention is to provide such a structure in which the lever and cable are positioned and arranged so that the movement of the lever is stopped before the said line between the lever axis and the first point becomes parallel with the cable proximal end portion. The lever may be disposed to engage the hand grip to stop such movement before the line becomes parallel with the cable portion or the cable proximal end portion may be disposed to engage the lever mounting means or pin about which the lever pivots to stop such movement before the line becomes parallel with the cable portion. In other words, in the present invention, means are provided for stopping movement of the lever in its clutch-engaging position before the said line becomes parallel with the cable proximal end portion. It will be appreciated that, when the line is parallel with the cable proximal end portion, the center point of the theoretical over-center system has been obtained. In that centered position, theoretically, no force would be required to hold the lever against the urgings of the spring clutch. For safety reasons, it is better to keep the system from reaching this center condition so that there will always be a small but comfortable component of force on the lever to move the lever to its clutch-disengaging position when the lever is released. As soon as the lever starts to move toward its clutch-disengaging position, the angle becomes greater and the component of the spring force becomes proportionally greater.

In this description and in the appended claims, the terms "control cable" or "flexible cable" are intended to refer to the very conventional and commercially available types of motion transmitting devices including a flexible wire or cable which is received in a cover or sheath. In some cases, the sheath may be rigidly anchored at both ends with the proximal end of the wire or cable connected to the lever and its distal end connected directly to the clutch actuator member. In another embodiment, the sheath may be anchored to the handle at its proximal end and connected to the actuator member at its distal end with the wire or cable being connected to the lever at its proximal end and connected to the mower frame or to a heavy spring which is connected to the mower frame at its distal end. In this latter case, movement of the lever tends to straighten out the wire or cable which in turn causes the sheath to straighten out pushing the clutch actuator member to its clutch-engaging position. In both cases, however, the proximal end portion of the control cable or flexible cable flexes generally about its point of connection to the handle between its first angle position relative to the said line and its second angle position relative to said line.

Other objects and features of the present invention will become apparent as this description progresses.

To the accomplishment of the above and related objects, this invention may be embodied in the forms illustrated in the accompanying drawings, attention being called to the fact, however, that the drawings are illustrative only, and that change may be made in the spe-

3 cific constructions illustrated and described, so long as the scope of the appended claims is not violated.

Figure 1:
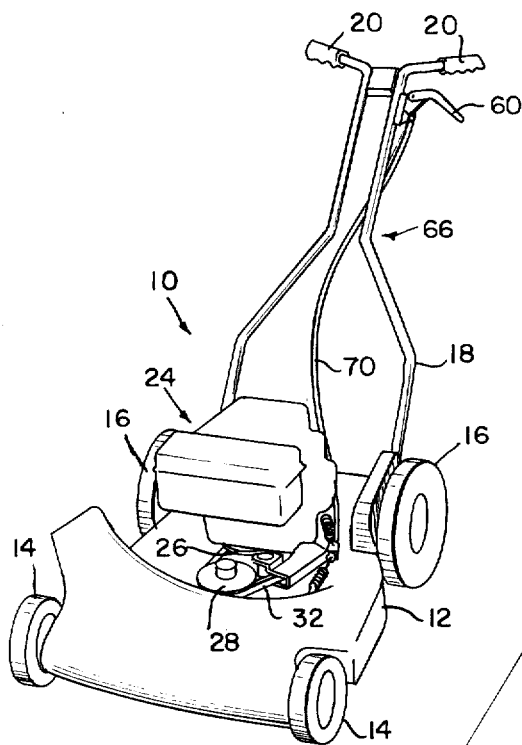
FIG. 1 is a perspective view of a self-propelled lawn mower.

Referring now particularly to the drawings, a self-propelled mower 10 comprising a frame 12 supported by front wheels 14 and rear wheels 16 will be seen. A handle 18 is provided for steering and controlling the mower, the handle providing conventional hand grips 20. An engine 24 is conventionally mounted upon the frame 12 as the prime mover for driving either the set of wheels 14 or 16 and for driving a grass cutting blade conventionally disposed beneath the frame 12. A pulley 26 is mounted upon the output shaft of the engine, and a pulley 28 is mounted upon the frame 12 forwardly of the pulley 26. An idler pulley 30 is provided and a belt 32 is trained about all of the pulleys 26, 28, 30. The idler pulley 30 is mounted upon a movable bracket 36 which serves as the said clutch actuator member in the illustrative embodiment. The bracket 36 is mounted upon the frame 12 for pivotal movement about the axis indicated at 38 between its clutch-engaging position (tightening the belt 32) and its clutch-disengaging position (loosening the belt 32). Spring means 42 is provided for urging the bracket 36 to its clutch-disengaging position, the illustrative spring means being connected between a flange 44 on the bracket 36 and a member 46 which is fixed relative to the frame 12.

Figure 2:
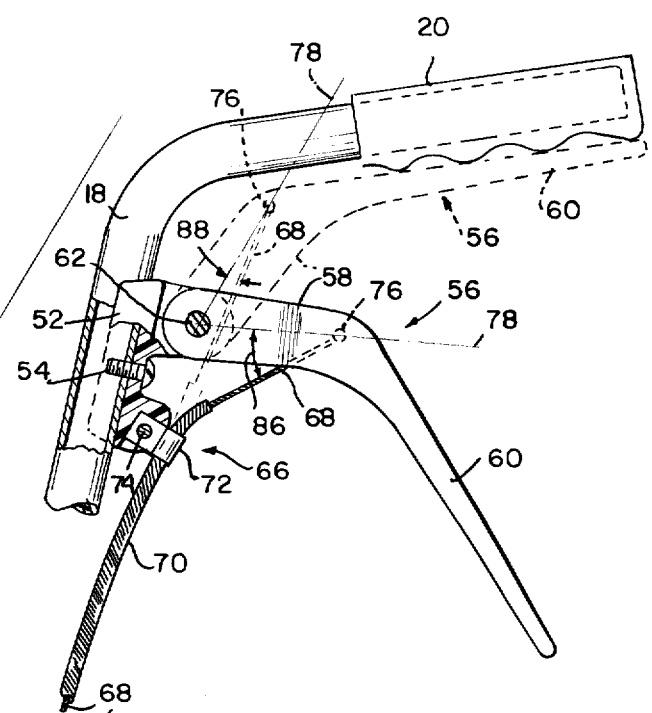
FIG. 2 is a diagrammatical view showing how the clutch control means of the present invention functions.
Figure 2:
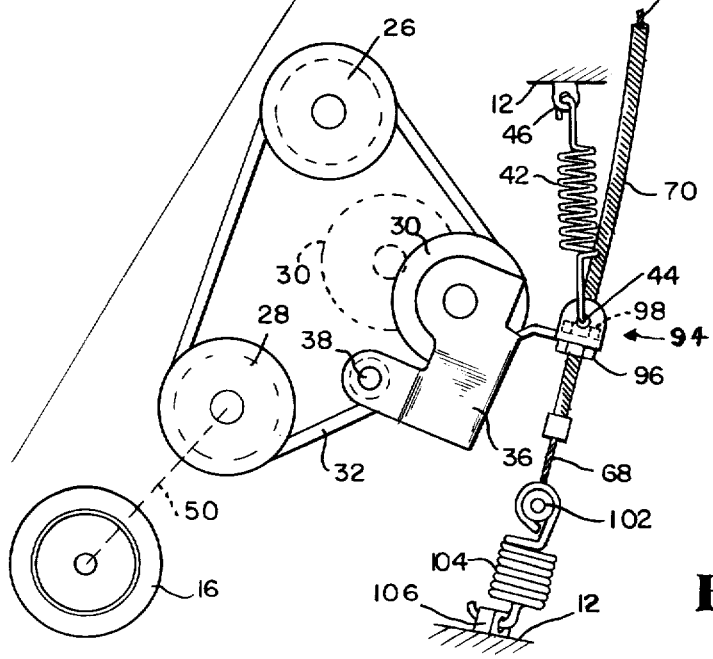

In FIG. 2, the driving connection between the rear wheels 16 and the pulley 28 is indicated by the dashed line 50. This driving connection can take many different forms such as gears, chains and, combinations thereof. It will be appreciated that self-propelled lawn mowers conventionally have belt-drive systems drivingly connected to either the front or rear wheels. Such systems also have had clutches for breaking the driving connection. The structure of the present invention is novel and advantageous because the clutch actuating system involves a particular type of dead man's control.

Particularly, referring to FIG. 2, it will be seen that there is a bracket 52 mounted near the proximal end of the handle 18 by means such as the illustrative screw 54. A lever 56 having a proximal portion 58 and a distal portion 60 is mounted upon the bracket 52 by means such as the illustrative pin 62 for pivotal movement about the axis of the pin. The lever 56 moves between its clutch-disengaging position shown in solid lines and its clutch-engaging position shown in broken lines where the distal portion 60 is adjacent the hand grip 20 to be easily gripped. In its clutch-disengaging position, the proximal portion 58 of the lever 56 extends generally in the same direction as the hand grip 20 while, in its clutch-engaging position, the proximal portion 58 extends generally toward the hand grip 20.

A control cable 66 is provided and is connected between the lever 56 and the actuator member or bracket 36. In the illustrative embodiment, the control cable 66 includes a wire 68 and sheath 70 covering the wire and in which the wire reciprocates. A clip 72 and a fastening element 74 are provided for rigidly connecting the proximal end of the sheath 70 to the bracket 52 as illustrated in FIG. 2. Then, the proximal end of the wire 68 is connected to the lever 56 at the point indicated by the reference numeral 76. The reference numeral 78 indicates a straight line between the pivot axis (axis of pin 62) for the lever 56 and the point of connection 76.

When the lever 56 is in its clutch-disengaging position, the line 78 defines a first angle 86 with respect to the proximal end portion of the cable 66 and, when the lever 56 is in its clutch-engaging position, the line 78 defines a second and significantly smaller angle 88 with respect to the proximal end portion of the cable. In other words, with the lever 56 in its clutch-engaging position, the component of force tending to move the lever about its pivot axis is very significantly smaller than it is when the lever starts moving away from its clutch-disengaging position toward its engaging position.

In the embodiment of FIG. 2, the sheath 70 of the flexible cable is connected to the flange 44 of the bracket 36 by conventional means such as the illustrated connector elements 96, 98. The distal end of the wire 68 is connected to a stud 102 which, in turn, is connected by a heavy spring 104 to a connector member 106 which is fixed relative to the frame 12. The flexible cable 66 is bowed or curved as shown in FIG. 1 to reach from the lever 56 to the bracket 36. Because of this curvature, when the lever 56 is moved from its solid line position (FIG. 2) to its broken-line position, the sheath 70 tends to straighten out and apply a compressive force on the flange 44 which pivots the bracket 36 clockwise about the axis 38 to tighten the belt 32. The spring 104 is provided primarily for the purpose of limiting the force which can be applied to the wire 68.

Figure 3:
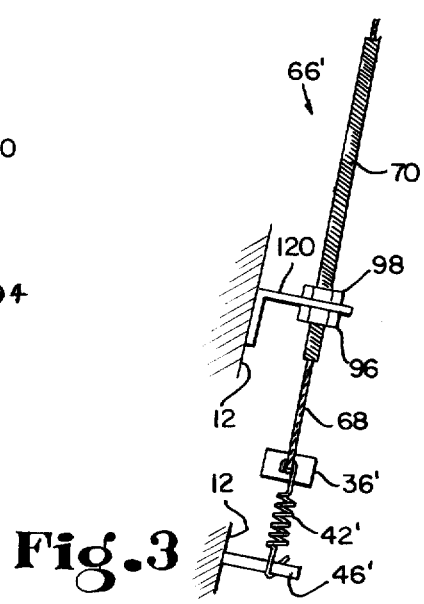
FIG. 3 is another diagrammatical view showing a different method of attaching the flexible cable to the clutch actuator member.

Referring now to FIG. 3, a perhaps more conventional use of a control cable 66' will be discussed. That control cable 66' has the distal end portion of its sheath 70 rigidly connected to a flange 120 which is stationary relative to the frame 12 and the distal end portion of its wire 68 connected to a clutch actuator member or bracket 36'. Then the spring 42' urges the bracket 36' to its clutch-disengaging position. In the structure of FIG. 3, movement of the lever 56 moves the wire 68 relative to its sheath 70 to move the bracket 36' to its clutch-engaging position.

With the structure shown in FIG. 2, it takes slightly less than one pound or about fourteen ounces to hold lever 56 in its clutch-engaging position which is quite comfortable. It takes considerably more to pull the lever 56 from its solid-line position, i.e., a pull of six or seven pounds.

For reasons discussed above, it is important to keep the lever and cable arrangement from moving to an over-center condition such that the lever would not move to its clutch-disengaging position when released. This may be accomplished by having some sort of stop means for stopping the movement of the lever 56 or the cable 66 before the line 78 becomes parallel with the cable proximal end portion. For instance, the engagement of the distal end portion 60 with the hand grip 20 may serve to stop the lever 56 before the line 78 becomes parallel with the proximal end portion of the cable. Alternatively, for instance, the engagement of the proximal end portion of the cable with the pin 62 may stop the movement before the line 78 becomes parallel with the proximal end portion of the cable.

While the control cable 70 and lever 60 arrangement has been shown and described thus far in connection with the driving of a self-propelled lawn mower, it will be appreciated that the same arrangement or type of control mechanism may be applied to the clutch for the blade of a lawn mower or to the combination clutch which serves the blade as well as the drive wheels of the mower. For instance, the pulley 28 may preferably be mounted on the same shaft as the blade for the mower 10 such that loosening of the belt 32 will stop the blade as well as the drive wheels 16. Alternatively, the pulley 26 might be the split pulley type of clutch disclosed in U.S. Pat. No. 2,957,561 with the upper pulley half connected to the engine shaft for rotation therewith, the lower pulley half connected to the blade for rotation relative to the engine shaft, and the belt 32 providing the driving connection between the pulley halves when it is tight. In such a system, the blade will stop when the belt 32 is loosened. In short, the mechanism of the present invention may control the blade individually, the traction wheels individually, or the blade and traction wheels together.

Finally, it will be appreciated that the control cable 70 and lever 60 mechanism may be used to control the clutches of a wide variety of implements in addition to lawn mowers. Any apparatus with an engine and a clutch having a spring urged actuator member may be controlled by the mechanism of the present invention.

We claim:

1. An apparatus including a frame, a rotary element mounted upon said frame, wheels supporting said frame for movement upon the ground, a handle secured to said frame for guiding such movement, said handle providing a hand grip, a prime mover mounted upon said frame, and clutch means for drivingly connecting said prime mover to said rotary element, said clutch means including an actuator member movable between a clutch engaging position and a clutch disengaging position, and spring means for yieldably urging said actuator member to its disengaging position, in which the improvement comprises lever means for moving said actuator member to its clutch engaging position, thereby to drive said rotary element by said prime mover, said lever means including a lever having a proximal end portion and a distal end portion, means for mounting said proximal end of said lever on said handle beneath said hand grip for pivotal movement of said distal end portion about an axis toward and away from said hand grip, a control cable connected between said actuator member and said lever so that movement of said distal end portion of said lever toward said hand grip moves said actuator member against the urging of said spring means toward its said clutch engaging position, the proximal end of said control cable being connected to said lever at a first point thereon between said proximal and distal end portions thereof and at a first distance from the pivot axis of said lever, the distal end of said cable being connected to said actuator member, said lever and control cable being positioned and arranged such that a straight line extending between said lever axis and said first point is at a first angle with respect to the proximal end portion of said cable when said actuator member is in its clutch disengaging position and at a second and significantly smaller angle slightly greater than zero degrees with respect to said proximal end portion of said cable when said distal end portion of said lever is moved toward said hand grip and said actuator member is in its clutch engaging position, whereby the force necessary to hold said distal end of said lever adjacent said hand grip is significantly less than the force necessary initially to pull the lever toward the hand grip, said lever and cable being positioned and arranged such that the movement of said lever is stopped before the said line between the lever axis and the first point becomes parallel with said proximal end portion of said cable.

2. The improvement of claim 1 in which said lever is positioned and arranged such that said line extends generally in the same direction as said hand grip when said actuator member is in its clutch disengaging position and generally toward said hand grip when said actuator member is in its clutch engaging position.

* * * * *